United States Patent [19]

Armbruster

[11] Patent Number: 5,217,513
[45] Date of Patent: Jun. 8, 1993

[54] AIR FILTER ASSEMBLY

[76] Inventor: Joseph M. Armbruster, 2700 NE. 47th St., Lighthouse Point, Fla. 33064

[21] Appl. No.: 877,142

[22] Filed: May 11, 1992

[51] Int. Cl.$^5$ .................. B01D 29/56; B01D 46/18
[52] U.S. Cl. ......................... 55/274; 55/351; 55/486; 55/527; 55/DIG. 42
[58] Field of Search ............... 55/274, 351–354, 55/482, 486–489, 527, DIG. 42

[56] References Cited

U.S. PATENT DOCUMENTS

| | | | |
|---|---|---|---|
| 1,866,650 | 7/1932 | Hill | 55/274 X |
| 2,841,073 | 7/1958 | Forshee | 55/354 X |
| 2,875,680 | 3/1959 | Forshee | 55/354 X |
| 2,881,859 | 4/1959 | Nutting | 55/352 |
| 3,063,222 | 11/1962 | Hagendoorn | 55/354 |
| 3,280,538 | 10/1966 | Schwarz | 55/354 |
| 3,280,539 | 10/1966 | Parrott | 55/354 |
| 3,337,898 | 8/1967 | Schmid et al. | 55/351 X |
| 3,552,098 | 1/1971 | Cochran | 55/351 X |
| 3,774,373 | 11/1973 | Welch et al. | 55/354 |
| 3,800,509 | 4/1974 | Carr et al. | 55/352 X |
| 4,174,205 | 11/1979 | Koushiafes | 55/354 |
| 4,221,576 | 9/1980 | Phillips, Jr. | 55/352 |
| 4,321,064 | 3/1982 | Vargo | 55/354 X |
| 4,627,863 | 12/1986 | Klein | 55/354 |
| 4,894,071 | 1/1990 | Klein | 55/351 X |

FOREIGN PATENT DOCUMENTS

| | | | |
|---|---|---|---|
| 1-104319 | 4/1989 | Japan | 55/354 |
| 1-104320 | 4/1989 | Japan | 55/354 |
| 1-228520 | 9/1989 | Japan | 55/354 |

OTHER PUBLICATIONS

Cambridge Roll–Flo Combination Filters, Bulletin 157A, 1964, Cambridge Filter Corp. Syracuse, N.Y. 13201 8 pages.

Primary Examiner—Robert Spitzer
Attorney, Agent, or Firm—Jacobson, Price, Holman & Stern

[57] ABSTRACT

An air filter assembly and more specifically the use and combination of a relatively inexpensive and easily replaced paper filter associated with a conventional polyfoam or fiberglass filter conventionally employed in an intake of an air duct system associated with an air conditioning system or air heating system utilized in homes, offices and the like. Specifically, the air filter assembly includes a rolled filter paper that is drawn across the upstream side of a polyfoam filter or fiberglass filter which acts as a support for the filter paper with the paper filter being replaced periodically by moving a new segment of paper filter from the paper supply roll to a position in alignment with and in engagement with the polyfoam filter and disposing of the used paper filter. An inspection window is provided in the air intake louver door normally provided in air conditioning-/heating systems to enable the condition of the paper filter to be observed to determine if the paper filter should be changed. In one embodiment, the paper filter is manually pulled to move a new segment into alignment with the polyfoam filter. In another form, the paper filter is moved from a supply roller into a take-up roller in the canister by a drive assembly which provides automatic movement of the paper filter at predetermined intervals.

8 Claims, 3 Drawing Sheets

AIR FILTER ASSEMBLY

BACKGROUND OF THE INVENTION

1. Field of the Invention

The present invention generally relates to an air filter assembly and more specifically the use and combination of a relatively inexpensive and easily replaced paper filter associated with a conventional polyfoam or fiberglass filter conventionally employed in an intake or an air duct system associated with an air conditioning system or air heating system utilized in homes, offices and the like. Specifically, the air filter assembly includes a rolled filter paper that is drawn across the upstream side of a polyfoam filter or fiberglass filter which acts as a support for the filter paper with the paper filter being replaced periodically by pulling the free end thereof to move a new segment of paper filter from the paper supply roll to a position in alignment and in engagement with the existing filter structure and disposing of the used portion of the paper filter. An inspection window is provided in the air intake louver door normally provided in air conditioning/heating systems to enable the condition of the paper filter to be observed to determine if the paper filter should be changed.

2. Description of the Prior Art

Various efforts have been made to remove various contaminants from air being circulated through an air conditioning or heating system by the provision of a replaceable filter. Such prior devices include the use of a fiberglass or polyfoam filter positioned in the intake opening in the return air duct with the filter being positioned interiorly of a louvered door, grill or the like which can be opened or removed to replace the filter. It is a time consuming job to replace the filter and the filters are relatively expensive especially when considering the frequency of replacing existing conventional filters depending upon the particulate contaminants in the air being circulated. In addition to being time consuming, when the air intake is in a relatively inaccessible position, such as in the ceiling, it is necessary to obtain a ladder to gain access to the intake door or grill in order to replace the filter which becomes a messy and somewhat dangerous operation.

Additionally, efforts have been made to provide a replaceable filter by using a filter media that can be moved transversely across an air flow path. The following U.S. patents exemplify the type of developments in this field of endeavor.

U.S. Pat. No. 3,337,898
U.S. Pat. No. 4,174,205
U.S. Pat. No. 4,321,064
U.S. Pat. No. 4,627,863
U.S. Pat. No. 4,894,071

While the above patents disclose the general concept of moving a paper filter across an air flow path, the prior art does not disclose the specific combination of components of the present invention which enables the paper filter to be effectively combined with a polyfoam or fiberglass filter and the structure for associating the filter with existing components with the air intake door and opening in a return air duct in an air conditioning or heating system.

SUMMARY OF THE INVENTION

An object of the present invention is to provide an inexpensive and easily replaced paper filter associated with and combined with a polyfoam filter or the like provided with a rigid frame with the paper filter being guided for movement between opposed edges of the polyfoam filter to enable the filter paper to be quickly and easily moved in relation to the polyfoam filter to quickly and easily replace the paper filter thereby eliminating the necessity of replacing the polyfoam filter.

Another object of the invention is to provide an air filter assembly in accordance with the preceding object in which the paper filter is provided in a supply roll mounted on a spindle with the polyfoam filter frame including inwardly facing channel-shaped edge guides for the filter paper with the air intake louver door being openable to provide access to the filter paper supply roll and access to the channel-shaped guides to enable the edges of the filter paper to be inserted into the channel-shaped guides.

Another object of the invention is to provide an air filter assembly in accordance with the preceding objects in which the paper filter has a free edge at one end thereof concealed by a small pivotal access door to maintain the air-tightness of the filter assembly with the access door being easily opened to permit the free end of the paper filter to be grasped and moved across the polyfoam filter to align a new segment of the paper filter with a polyfoam filter with the used segment of the paper filter then being separated and disposed of.

A further important object of the invention is to provide an air filter assembly which can be quickly and easily installed in already existing air circulation systems as a retrofit structure, incorporated into new air circulating systems with an inspection window being provided to enable the upstream side of the filter paper to be observed to facilitate determination when the filter paper should be changed.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
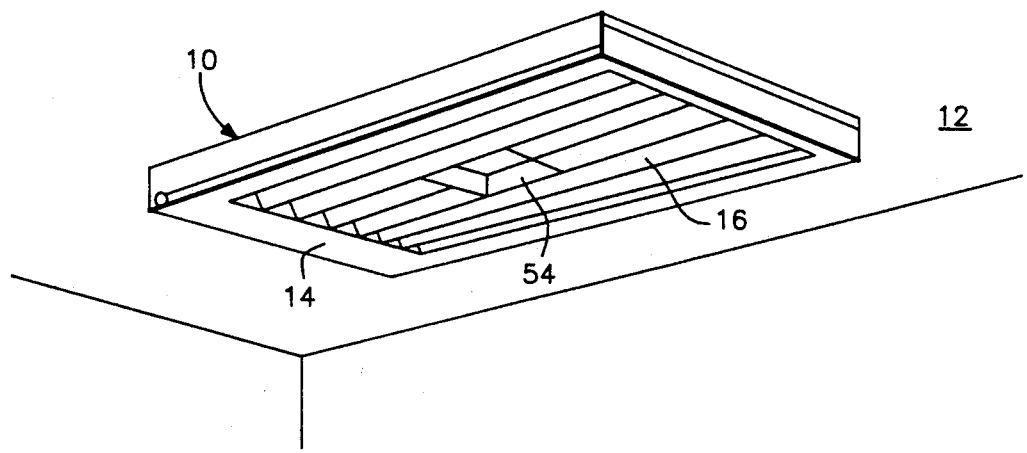
FIG. 1 is a perspective view of a ceiling mounted air intake for an air circulation system with the air filter assembly of the present invention incorporated into and associated with the air intake louver door.

FIG. 1 illustrates an air filter assembly of the present invention generally designated by reference numeral 10 mounted in the ceiling 12 of a room or other enclosure with the air filter assembly including a pivotally supported door 14 having a plurality of louvers 16 therein forming an air intake for an air duct with the assembly 10 being connected to peripheral outwardly extending flanges 18 conventionally provided on a passageway or hole 20 that is connected to the air return duct in a conventional manner.

Figure 5:
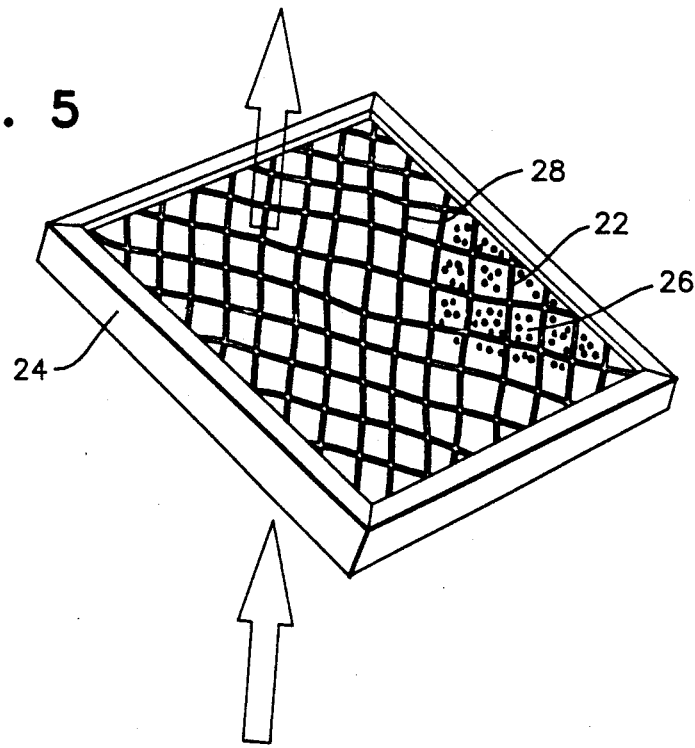
FIG. 5 is a perspective view of a polyfoam filter used in combination with the paper filter in the assembly of this invention.
Figure 6:
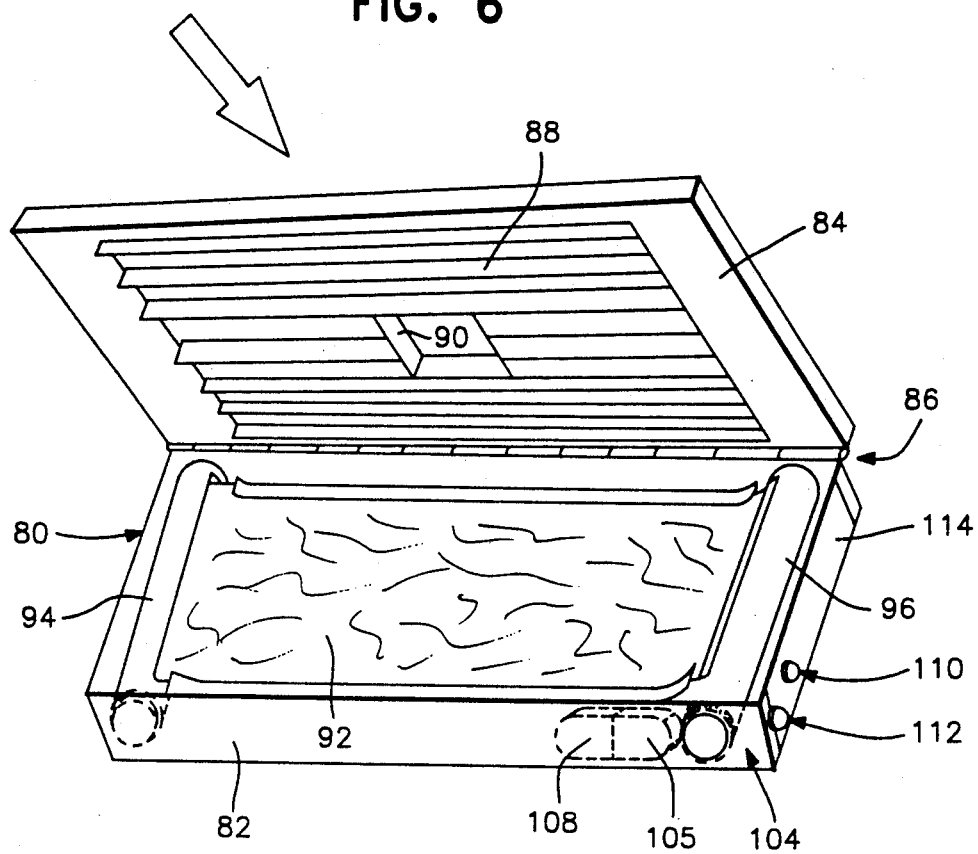
FIG. 6 is a perspective view of another embodiment of the air filter assembly of this invention illustrating an electrically driven take-up roller to move segments of a paper filter from a supply roll and across a polyfoam filter.
Figure 7:
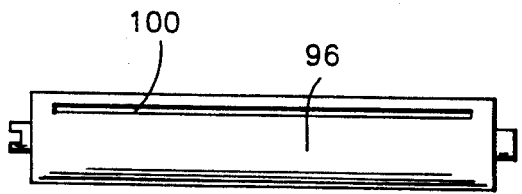
FIG. 7 is an elevational view of the take-up canister for used paper filter.
Figure 8:
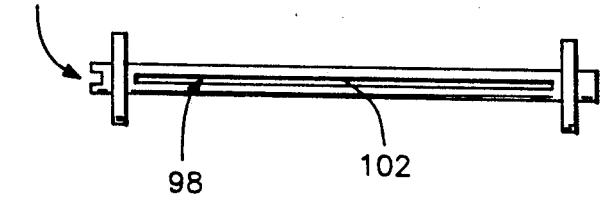
FIG. 8 is an elevational view of the slotted roller.
Figure 9:
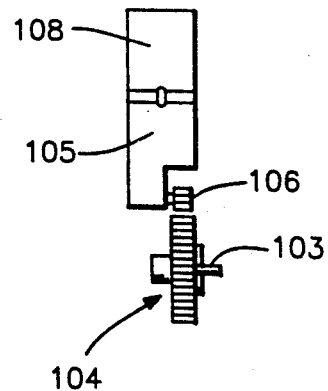
FIG. 9 is a schematic view of the drive unit for the take-up roller in the canister.

The air filter assembly 10 includes a polyfoam filter generally designated by reference numeral 22 and illustrated in FIG. 5 as including an aluminum channel-shaped peripheral frame 24 receiving a polyfoam filter member 26 and an expanded metal screen or grill 28 on the outlet or downstream side of the filter. The polyfoam filter is an existing-type filter and conventionally employed as an air intake filter and located within the intake door 14 in order that air passing through the louvers 16 into the return duct will pass through the polyfoam filter material 26. As is well known, polyfoam filters or fiberglass filters which also can be used must be replaced periodically which requires that the intake louver door or other intake grill or grate be opened or removed and the filter 22 replaced.

In the present invention, a filter paper in the form of a continuous filter paper web 30 is provided and positioned against the upstream or inlet side of the filter 22. The paper filter web is provided in a supply roll 32 and extends from one edge of the filter 22 to the other and terminates in a free end 34 which can be grasped at the opposite edge of the filter and pulled longitudinally so that a clean and unused segment of the paper filter web 30 can be aligned with the filter 22 on a periodic basis thus eliminating the necessity of periodically removing and replacing the existing filter 22.

Figure 2:
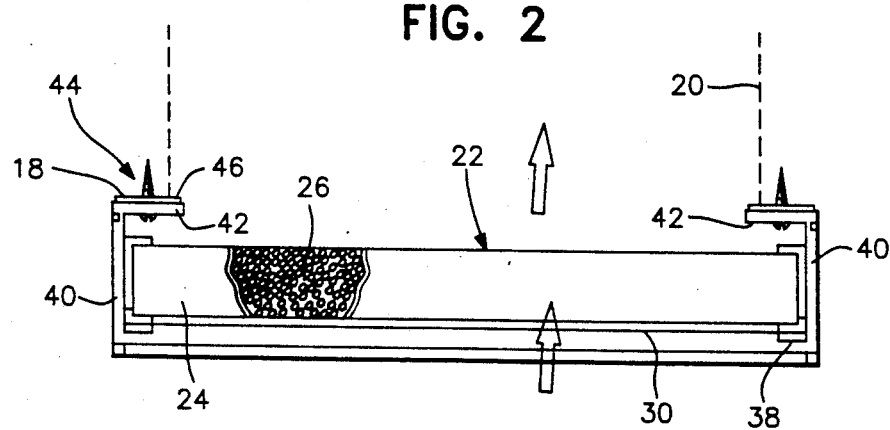
FIG. 2 is a transverse sectional view of the air filter assembly of the present invention illustrating the structural details thereof and its association with the entranceway into an air duct.

As illustrated in FIG. 2, the filter frame 24 is provided with opposed, inwardly facing channel-shaped guides 38 along opposite edges thereof on the upstream or inlet side of the filter 22. This structure provides edge guides for the filter paper 30 with the filter paper also engaging the inlet side surface of the polyfoam filter material 26 which supports the paper filter 30 and the polyfoam material 26 provides a reduced frictional drag to the paper filter 30 when it is being replaced which requires that the paper filter slide along the surface of the filter material 26 if the paper filter is changed while the air circulating system is in operation.

Figure 3:
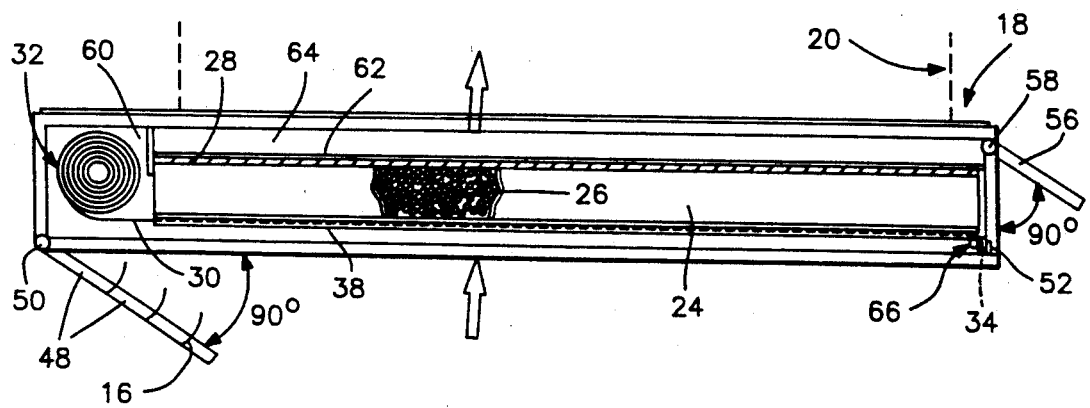
FIG. 3 is a longitudinal sectional view illustrating further structural details of the air filter assembly of this invention.
Figure 4:
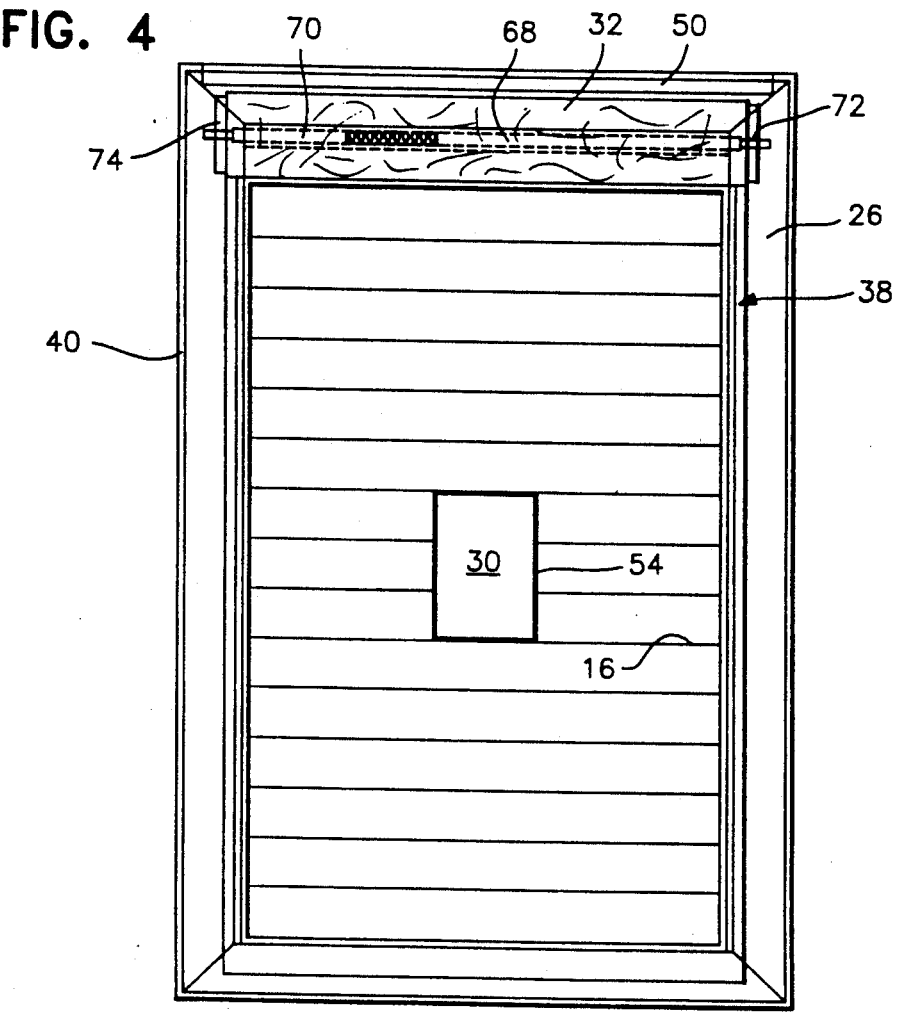
FIG. 4 is a bottom plan view of the invention with portions omitted for clarity.

As illustrated in FIGS. 2-4, the intake door 14 includes a frame 40 which extends peripherally thereof with an inwardly extending flange 42 around the periphery of the passageway 20 and which abuts and engages the flange 18 and is secured thereto by sheet metal screws 44 and double faced adhesive tape 46 thus securely mounting the frame to the passageway 20 which leads to the return duct. A pivotal door member 48 is attached to one edge of the frame 40 by a hinge pin 50 and the opposite edge is secured in closed position by a latch pin 52. Centrally of the door member 48 is an inspection window 54 which enables the paper filter 30 to be observed to determine when the paper filter needs to be changed. The opening 54 is centrally located in the door member 48 and is observable even though the door is ceiling mounted. At the end of the frame 40 opposite to the hinge pin 50, a filter paper access door 56 is provided which is hingedly mounted by a hinge structure 58 at its upper edge to the upper edge of the frame 40 with this door providing access to the free end of the filter paper and also enabling the filter 22 to be slid outwardly of the frame 40 for replacement or cleaning when necessary. The filter frame 24 is moved inwardly through the door 56 until it engages a stop 60 adjacent the supply roll 32 of the paper filter 30 as illustrated in FIG. 3. Also, guide flange 62 is provided for the upper edge of the filter frame 24 and the upper flange of the channel-shaped guide 38 forms a guide for supporting the lower edge of the frame 24 as illustrated in FIG. 2. As illustrated in FIGS. 2 and 3 the filter 2 is spaced below the frame 40 thus forming a plenum chamber 64 above the filter 22 or at the outlet side thereof since the filter assembly can be mounted horizontally in the ceiling as illustrated or vertically in a vertical wall when necessary.

At the free end of the paper filter 30, a rod 66 is provided which supports the paper web and provides a surface by which the paper web can slide or roll over when it is being pulled and the used segment of the paper filter is separated from the unused segment of the paper filter. At the opposite side of the frame, the supply roller 32 is supported by a removable spindle 68 having outwardly spring biased components which have end pins 70 received in sockets or apertures 72 in support members 74 rigid with the frame 40 with this structure being somewhat similar to that used in supporting toilet paper rolls in wall fixtures. This enables the filter paper supply roll 32 to be easily replaced by forcing the pins 70 inwardly to release the spindle 68 from the supports 74. The frame structure 40 may be constructed of aluminum or plastic with the double faced adhesive tape having a foam core for mounting the frame together with the additional mounting of self-tapping screws providing secure replacement for existing filter structures. The plenum chamber 64 enables the entire filter area and filter paper area to be used to their full extent as a filter. Otherwise, the area of the passageway 20, which is less than the area of the filter, would pull air only through the area of the filter and filter paper corresponding to the area of the passageway 20 if the filter 22 is located against the end of the passageway 20.

In use, enough filter paper 30 is contained in a roll to permit changing the filter paper once a week for a 6-month period thus providing an easy and inexpensive changing of the filter paper without the cost and work associated with changing a conventional fiberglass-type filter. When changing the filter paper roll about every 6 months, the polyfoam filter 22 should also be removed and washed off under running water or vacuumed cleaned if necessary. The filter paper is biodegradable unlike conventional fiberglass filters and the use of the filter paper eliminates the storage problem relating to maintaining a supply of conventional replacement filters. By pulling out the contaminated segment of filter paper once a week, environment within an enclosed space will be provided with cleaner air as compared to using a fiberglass filter which, when contaminated, allows airborne particulate material to pass through thus contaminating the air being circulated.

As illustrated in FIGS. 6-9, an electrically powered air filter system is disclosed and designated by reference numeral 80 and includes a peripheral filter frame 82 having a louver door 84 hinged to one edge thereof by a piano hinge 86. The door louvers 88 are angled and provided with a window 90 to enable observation of a paper filter 92 which is supplied on a supply roll 94 which may include a spring biased spindle structure similar to that in FIGS. 1-5 to mount the roll in the frame. A slotted take-up canister 96 is mounted at the opposite side of the frame 82 and includes a slotted take-up shaft 98 therein to which the end of the paper filter is connected by inserting the end of the filter paper 92 through the slot 100 in the canister 96 and the slot 102 in shaft 98.

The take-up shaft 98 is provided with a transversely slotted end 103 by which a driven gear 104 is connected for driving shaft 98. The gear 104 is driven by a gear motor 105 having an output drive gear 106 in meshing engagement with gear 102 for driving the take-up shaft 98. The motor 105 is controlled by an electronic control module 108 which includes a timer to automatically move a new segment of paper filter into registry with a polyfoam filter mounted in frame 82 at periodic intervals, such as once a week with control module moving the paper filter a predetermined linear distance for this purpose. A manual advance push button switch 110 is provided to advance the paper filter at any time when deemed necessary by observation of the filter through the window 90. Also, an air flow sensor such as a pitot tube can be placed in the air flow path downstream of the filter to automatically advance the filter paper whenever air flow rate is reduced below a predetermined rate. An indicator light 112 is provided to indicate operation of the air filter system.

The internal structure of the frame 82, the support for the polyfoam filter and the guide for the paper filter is the same as the form of the invention shown in FIGS. 1-5 with the end wall at the take-up canister having a pivotal door 114 to enable change of the polyfoam filter when the take-up canister, supply roller and paper filter are being replaced.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. An air filter assembly for an air circulating system comprising a peripheral frame adapted to be supported in communication with an intake opening in a return air duct, a polyfoam filter mounted in said frame, a paper filter engaged with an inlet surface of the polyfoam filter to remove particulate material from air passing through the polyfoam filter, said frame having inwardly facing generally channel-shaped guides at opposite edges thereof receiving edges of the paper filter, said paper filter being provided on a supply roll at one edge of the polyfoam filter, means mounting the supply roll from the frame, the paper filter including a free end at the edge of the frame opposite to the supply roll to enable the free end of the paper filter to be moved to move a used segment of the paper filter outwardly of the polyfoam filter and aligning an unused segment of the paper filter with the polyfoam filter.

2. The filter assembly as defined in claim 1 wherein said peripheral frame includes a pivotal door overlying the paper filter with the door being provided with open areas enabling inlet of air through the paper filter and polyfoam filter into the return air duct, said door extending beyond the channel-shaped guides to provide access to the guides to enable insertion of the edges of the filter paper into the guides.

3. The filter assembly as defined in claim 2 wherein said door includes an inspection opening in the center thereof to enable the paper filter to be observed to determine when the paper filter needs to be replaced.

4. The filter assembly as defined in claim 1 wherein said frame includes an access door in an edge thereof opposite to the supply roll of paper filter to provide access to the free end of the paper filter and provide access to the polyfoam filter to enable the paper filter to be pulled outwardly to remove a used segment of the paper filter and enable the polyfoam filter to be removed for cleaning each time a supply roll of paper filter is depleted and replaced.

5. The filter assembly as defined in claim 1 wherein said frame includes means supporting the polyfoam filter spaced below an inlet passageway into the return duct to form a plenum chamber inwardly of the polyfoam filter to enable the complete area of the polyfoam filter and filter paper to be used as a filtering media even though the inlet passageway has a smaller area than the area of the filter assembly.

6. The filter assembly as defined in claim 1 wherein drive means moves said paper filter from the supply roll across the polyfoam filter.

7. The filter assembly as defined in claim 6 together with a take-up canister for receiving used paper filter for ease of disposal.

8. The filter assembly as defined in claim 7 wherein said drive means includes control means to operate said drive means automatically.

* * * * *